US007836313B2

(12) United States Patent
Ellard (10) Patent No.: US 7,836,313 B2
(45) Date of Patent: Nov. 16, 2010

(54) METHOD AND APPARATUS FOR CONSTRUCTING A STORAGE SYSTEM FROM WHICH DIGITAL OBJECTS CAN BE SECURELY DELETED FROM DURABLE MEDIA

(75) Inventor: Daniel J. Ellard, Belmont, MA (US)

(73) Assignee: Oracle America, Inc., Redwood City, CA (US)

( * ) Notice: Subject to any disclaimer, the term of this patent is extended or adjusted under 35 U.S.C. 154(b) by 1244 days.

(21) Appl. No.: 11/385,341

(22) Filed: Mar. 21, 2006

(65) Prior Publication Data

US 2007/0226809 A1 Sep. 27, 2007

(51) Int. Cl.
*G06F 21/00* (2006.01)
*H04L 9/14* (2006.01)
(52) U.S. Cl. .......................... 713/193; 726/30; 380/277
(58) Field of Classification Search ................... 726/30; 713/163–167, 183–193
See application file for complete search history.

(56) References Cited

U.S. PATENT DOCUMENTS

| 6,226,743 | B1 * | 5/2001 | Naor et al. ................... 713/177 |
| 2001/0030662 | A1 * | 10/2001 | Ohkawa et al. ............. 345/764 |
| 2002/0069280 | A1 * | 6/2002 | Bolik et al. .................. 709/225 |
| 2003/0056069 | A1 * | 3/2003 | Cabrera et al. .............. 711/161 |
| 2003/0161474 | A1 * | 8/2003 | Matsuzaki et al. .......... 380/277 |
| 2004/0215661 | A1 * | 10/2004 | Zhang et al. ............. 707/104.1 |
| 2004/0255048 | A1 * | 12/2004 | Lev Ran et al. ............. 709/249 |
| 2005/0238175 | A1 * | 10/2005 | Plotkin et al. ............... 380/281 |
| 2006/0080553 | A1 * | 4/2006 | Hall ............................ 713/189 |
| 2006/0129537 | A1 * | 6/2006 | Torii et al. ...................... 707/3 |

OTHER PUBLICATIONS

Dan Boneh and Richard J. Lipton, A Revocable Backup System, Department of Computer Science, Princeton University, 1996.*
Daniel Ellard, Efficient Secure Deletion of Digital Objects via Hierarcal Stub Deletion, Oct. 9, 2005, pp. 1-8.
Dan Boneh, et al., A Revocable Backup System, extended abstract, pp. 1-6, Princeton University, Department of Computer Science, Princeton, NJ.
Crescenzo, et al., How to Forget a Secret, extended abstract, pp. 1-11, University of California San Diego (La Jolla, CA), Counterpane Systems (Mountain View, CA) and Bell Labs, Information Sciences Research Center (Murray Hill, NJ).

* cited by examiner

*Primary Examiner*—Gilberto Barron, Jr.
*Assistant Examiner*—David Le
(74) *Attorney, Agent, or Firm*—Brooks Kushman P.C.

(57) ABSTRACT

In a data storage system, content-containing objects to be stored are added to a storage hierarchy that is based on content relationships. The content of each stored object is encrypted and a stub is associated with that object. For each stored object other than a root object, the stub comprises a function of a decryption key for the content of that object and the stubs of all of the ancestors of that object. The stubs can be used to calculate a new stub for a data object to be inserted into the storage hierarchy and to generate a decryption key for an existing object. Since these latter calculations for an object involve the stubs of all ancestors of that object, deleting a stub for an object securely deletes that object and all its descendants. An object can be moved by recalculating its stub.

20 Claims, 6 Drawing Sheets

METHOD AND APPARATUS FOR CONSTRUCTING A STORAGE SYSTEM FROM WHICH DIGITAL OBJECTS CAN BE SECURELY DELETED FROM DURABLE MEDIA

BACKGROUND

This invention relates to methods and apparatus for efficiently deleting digital objects from durable media in such a manner that the information in the objects can no longer be read by any tractable means. The ability to irrevocably destroy or "shred" data objects (such as files, directories, or archives) stored on durable media (such as magnetic tapes and disks) is an integral component of information life-cycle management, and is becoming a required feature of any data management system.

However, typical conventional data storage systems do not destroy the contents of deleted data objects, but simply mark the space they occupy as available for reallocation. In many cases, the contents of a deleted data object may be reconstructed, in whole or in part, via examination of the unallocated space. Using an analogy from the world of paper documents, deletion in conventional systems is equivalent to moving a document from a filing cabinet into a recycling bin—anyone with access to the recycling bin can still read the document until it has actually gone through the process of being recycled. This fact is not widely understood; a recent study shows that the majority of previously-used hard-drives contain easily recoverable data, even if the previous owners had deleted all of their files before re-selling the drives.

To make matters worse, in many cases, data stored on media (particularly contemporary magnetic data storage systems such as disks, tapes, and proposed MEMS drives) can often be reconstructed from latent data images even after the data on these media have been overwritten by new data, due to lingering effects produced by the storage of the original data. Practical methods to eliminate latent data images include physically destroying the storage media and repeatedly overwriting the original data with device-specific data patterns chosen to counteract lingering effects. The former method permanently destroys the media and the latter method takes a long time to delete large amounts of data, and can seriously impact performance of other operations during this time. This means that the act of destroying data stored on contemporary data storage systems may be considerably more expensive than the act of creating or accessing the data in the first place.

Several conventional methods have been devised to avoid the cost of overwriting each data object. The common characteristic of these methods is that each data object is stored in an encrypted form, and decryption is impossible without additional information stored in an associated data structure called a "stub" (which may be a decryption key) that is also stored and managed as part of the method. To render a data object inaccessible, it is only necessary to securely delete the stub of that object, because, without the stub, the decrypted form of the object cannot be recovered. If the size of a stub is smaller than the size of the object it protects, the cost of securely deleting that stub by repeated overwriting will be less than destroying the entire object in the same manner. For large objects, the cost of deleting the stub and the cost of deleting the object may differ by several orders of magnitude.

Although the cost of securely deleting the stub of a large object is smaller than securely deleting the contents of the object, it is still larger than the cost of simply unlinking the object. Therefore, the secure deletion of a large number of object stubs may still be a costly operation. In the worst case, the size of the objects may be similar to the size of the stubs, and securely deleting the stubs may be more costly than securely deleting the objects in the ordinary manner.

SUMMARY

In a data storage system constructed in accordance with the principles of the invention, content-containing objects to be stored are added to a storage hierarchy that is based on content relationships and extends from a root object down to leaf objects. The content of each stored object is encrypted and a stub is associated with that object. For each stored object other than the root object, the stub is the output generated by a function of a decryption key for the content of that object and the stubs of all of the ancestors of that object. Consequently, in order to obtain the decryption key for an object, the stubs of all ancestors of the object must be known. Therefore, securely deleting the stub of an object securely deletes that object and all of its descendants.

In one embodiment, the stub of the root object contains a key chosen randomly.

In another embodiment, the stub of the root object contains a key chosen by an administrator of the data storage system.

In still another embodiment, the stub of each object other than the root object comprises the exclusive-OR of the decryption key of the object and the stubs of all of the ancestors.

In yet another embodiment, an object other than the root object can be moved in the hierarchy without decrypting and re-encrypting the object content by simply recalculating the stub of the object. Since the stub of an object is defined in terms of the object key and the key of a parent object, an object can be re-parented by calculating a new stub using the same method used to insert an object in the hierarchy as a child of the new parent object.

DETAILED DESCRIPTION

Figure 1:
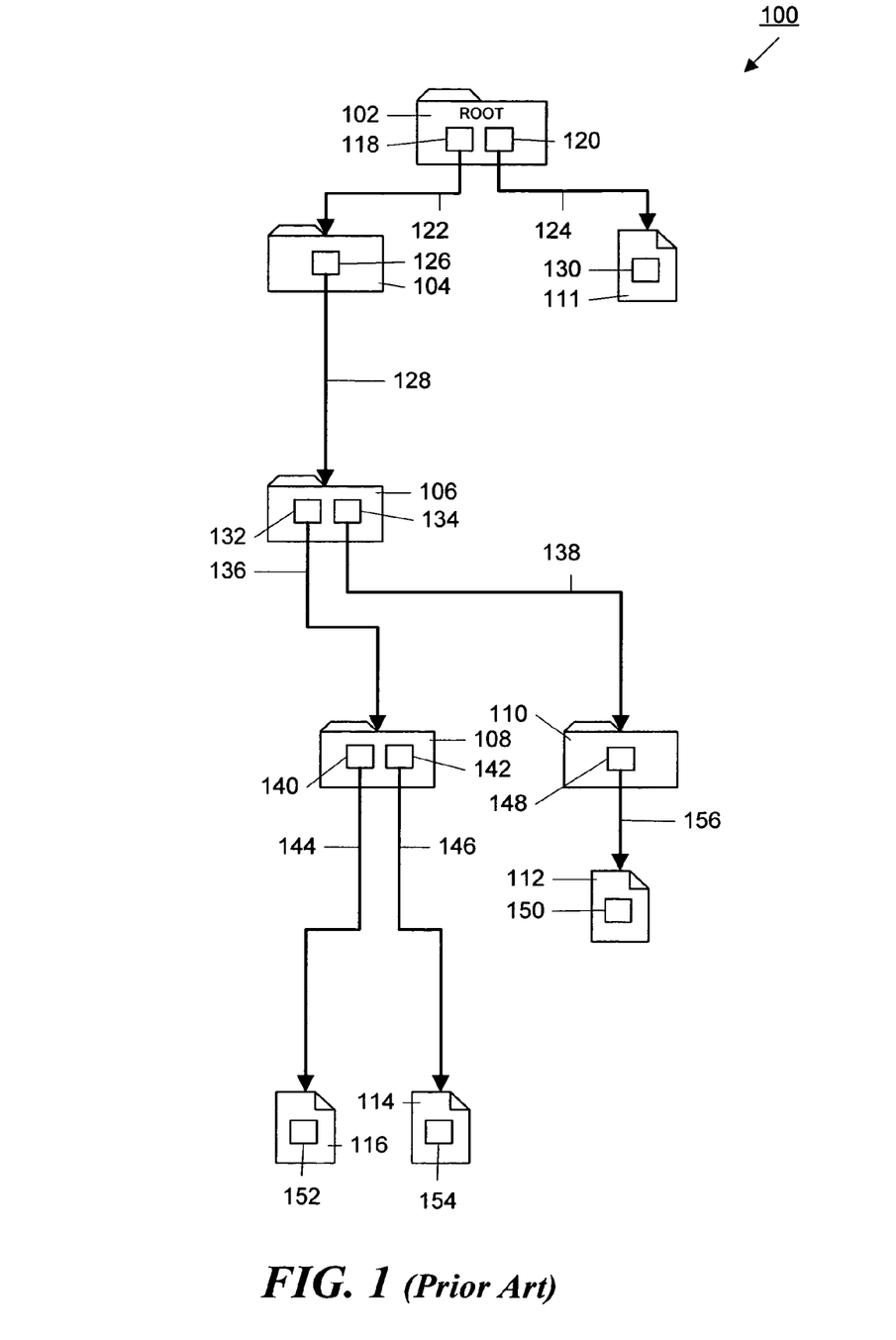
FIG. 1 is a block schematic diagram illustrating a conventional hierarchical data storage system.

In many conventional data storage systems, the stored objects are organized in a hierarchical structure, and, in these systems, many delete operations operate on a specific element in the hierarchy. For example, contemporary file systems are typically organized in a hierarchical manner consisting of files and directories. A directory may, in turn, contain other files and directories. Such a file system 100 is schematically illustrated in FIG. 1. The system shown is illustrative only and an actual file system may consist of more or fewer directories and files and these directories and files may be organized in a manner differently from that shown in FIG. 1, as would be evident to those skilled in the art. As shown, the file system contains directories 102-110 and files 111-116. Each directory contains references to other directories and files (although not shown, directories may also be empty and contain no references). For example, directory 102 contains references 118 and 120. Reference 118 references directory 104 as indicated schematically by arrow 122 and reference 120 references file 111 as indicated schematically by arrow 124. File 111, in turn, contains content 130. Similarly, directory 104 contains reference 126. Reference 126 references directory 106 as indicated schematically by arrow 128. Directory 106 also contains references 132 and 134. Reference 132 references directory 108 as indicated schematically by arrow 136 and reference 134 references directory 110 as indicated schematically by arrow 138. Directory 110, in turn, contains a reference 148 to file 112 as indicated schematically by arrow 156. File 112 contains content 150. Directory 108 contains references 140 and 142 which reference files 116 and 114, respectively, as indicated by arrows 144 and 146, respectively. Files 116 and 114 contain content 152 and 154, respectively.

Typical operations related to a file system, such as system 100, include creating new files or directories, deleting files or directories, and moving an element from one directory into another directory. In the discussion below, such a hierarchical file system will be used for purposes of explanation of the inventive principles. However, those skilled in the art would readily recognize that the inventive principles can also be applied in a straightforward manner to other types of hierarchical data storage systems. For example, another such hierarchy is the organization of a relational database. Relational databases are typically organized as set of tables, where each table consists of a set of rows and each row is a list of values. On a logical level, each table may be partitioned into sub-tables according to values that appear in the rows. For example, in a table containing information about transactions on private bank accounts, a table can be partitioned by account number into sub tables, each containing only the transactions of one account. In this context, a delete operation might securely delete the rows corresponding to a specific account.

Also, for the sake of simplicity, in the discussion below, it is assumed that a symmetric-key cipher is used to protect the contents of the files and directories. In this case, the encryption and decryption keys are identical, and therefore are denoted simply as a "key" without reference to encryption or decryption. The inventive embodiments described below can be easily generalized to use asymmetric-key ciphers by using two keys and having two stubs per object (one for each key) and performing each operation on both stubs.

In accordance with the principles of the invention, in one embodiment, a conventional hierarchical file system is modified to include a "hierarchical stub" for each file system object. The essential characteristic of a hierarchical stub is that the stub of every descendant object of the root object is defined in terms of both the key of that object and the stubs of all of its ancestor objects. Similarly, the key of every descendant object of the root can be calculated from its own stub and the key of its ancestor. By transitivity, this means that calculating the key of an object requires knowing the stub of the object and the stubs of all of its ancestors, and calculating the stub of an object requires knowing its key and the stubs of all of its ancestors.

The key of the root object is defined differently. In one embodiment, the stub of the root object serves as its key. In another embodiment, the key of the root object is provided by an external entity (such as an administrator, or a remote server). The benefit of the latter approach is that the root of the hierarchy, and therefore the entire hierarchy, is un-interpretable without additional, protected information—even if the data storage system is physically stolen, a thief cannot discover its contents.

Because the calculation of an object key requires knowing the stubs of all of its ancestors, if the stub of any ancestor of an object is unavailable, then the key for that object cannot be reconstructed and therefore the object is inaccessible. Similarly, if the object is a directory, securely deleting its stub makes it impossible to recover the key of any objects contained in that directory and any of their descendants. For example, securely deleting the stub of the root of a file system makes it impossible to recover the keys for any of the files on that file system. Similarly, the contents of a user home directory (including all files and subdirectories) can be securely deleted by securely deleting the stub of the home directory of that user.

In order to be sure that the objects are securely deleted, the keys and stubs must never be revealed to an untrusted party. In general, there is no reason that these keys and stubs would ever need to be revealed to any party since they are internal to the data storage system and do not appear in any visible interface. In the case of backup tapes or other archives (which could contain the stubs), a protocol similar to the keyfile management techniques described in "A Revocable Backup System", D. Boneh and R. J. Lipton, *Proceedings of the USENIX Security Symposium*, pp. 91-96, July 1996 or "Ephemerizer: Making Data Disappear", R. Perlman, Technical Report TR-2005-140, Sun Microsystems, Inc., February 2005, can be used to protect the backups with a revocable or automatically-expiring key.

A hierarchical stub can be constructed in accordance with the principles of the invention in the following manner. In this discussion, "x" denotes an arbitrary object in the storage hierarchy, "S(x)" denotes the stub of object x, and "K(x)" denotes the key for object x. The root of the hierarchy is denoted as "r". For simplicity of discussion, it is assumed that all objects except for the root object have a single parent object, and the parent of object x is denoted as "P(x)". Also, as discussed above, the stub of the root is selected as its key. The root key is selected randomly or by an administrator at initialization and, after initialization, neither the root object key nor the root object stub ever changes. The key for each object is chosen by a cryptographic random number generator (or some other method indistinguishable, by an outside observer, from such a generator). The object is encrypted with this key, using a symmetric-key cipher, before the object is stored. Note that none of the keys other than that of the root are stored durably. Object keys may be cached in volatile memory, but in the general case, they are computed from the stubs as needed.

With these definitions and assumptions, the stub of a object (other than the root object) is a function (Fs) of its key and the key of its parent object:

$$S(x)=Fs(K(x), K(P(x))) \qquad (1)$$

In addition, the key of the object is a function FK of its stub and the key of its parent:

$$K(x)=Fk(S(x), K(P(x))) \qquad (2)$$

In equations (1) and (2), functions Fs and FK are defined in an open form; that is, both of them assume that the caller knows K(P(x)). However, in the general case, the caller would not know K(P(x)) and therefore, it must be calculated by induction. In particular, K(P(x)) is known if P(x) is the root object, and K(P(x)) can be computed by FK(S(P(X)),K(P(P(x)))), which requires that K(P(P(x))) is known, and so forth. Therefore, the calculations of S(x) and K(x) depend on the value of the stub of every ancestor of object x.

The following discussion is a specific implementation of equations (1) and (2). In this implementation, stubs and keys are bit strings of fixed length. The hierarchy is defined in terms of its root, which must be created before any other operation can be performed. The stub for the root is defined to be its key.

$$S(r)=K(r) \quad (3)$$

In this implementation, a bitwise exclusive-OR function (XOR), denoted as $\otimes$, is used to define FK and Fs as follows:

$$Fk(S(x),K(P(x)))=S(x)\otimes K(P(x)) \quad (4)$$

$$Fs(K(x),K(P(x)))=K(x)\otimes K(P(x)) \quad (5)$$

The XOR function is convenient because it enables a simple relationship between FK and Fs, and is efficient to implement on contemporary computer architectures, but it is by no means the only practical function. For example, if the keys and stubs are drawn from the same set κ, then, for any group G=<+, κ>, group addition and subtraction can be used for Fk and Fs.

When a new object x with key K(x) is inserted into a storage hierarchy constructed with stubs as define in Equations (4) and (5), it is assigned a stub S(x) in terms of its decryption key K(x) and the key of its parent object, as defined in Equation (5) as follows:

$$S(x)=K(x)\otimes K(P(x))$$

Since, in general, the keys for objects are not known, this latter equation can be solved by repeated substitution of Equation 4 for K(P(x)) until the root object is reached resulting in the following:

$$S(x)=K(x)\otimes S(P(x))\otimes S(P(P(x)))\ldots \otimes S(r) \quad (6)$$

Figure 2:
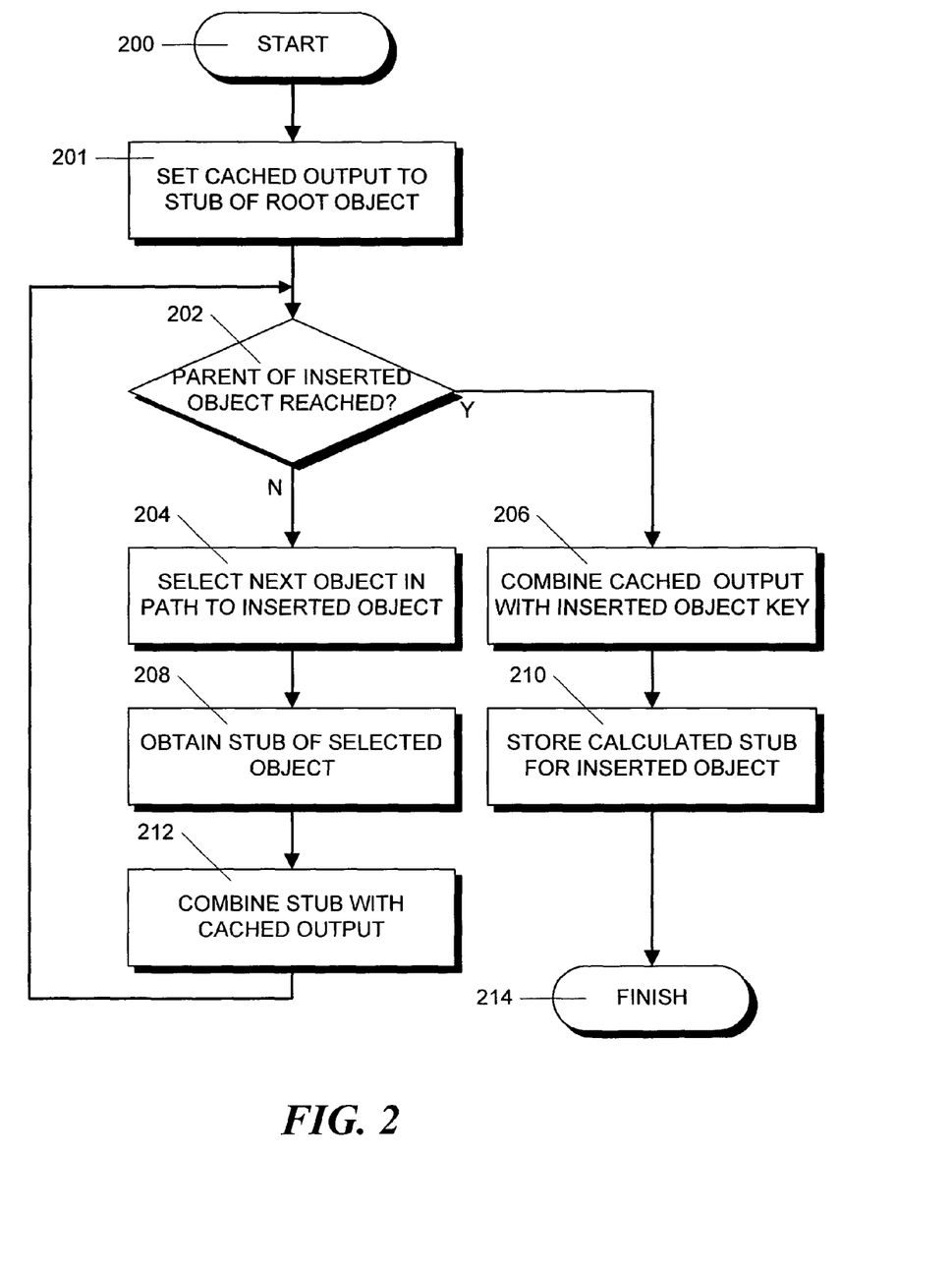
FIG. 2 is a flowchart showing the steps in an illustrative process for calculating a stub for a data object that has been inserted into the storage hierarchy.
Figure 3:
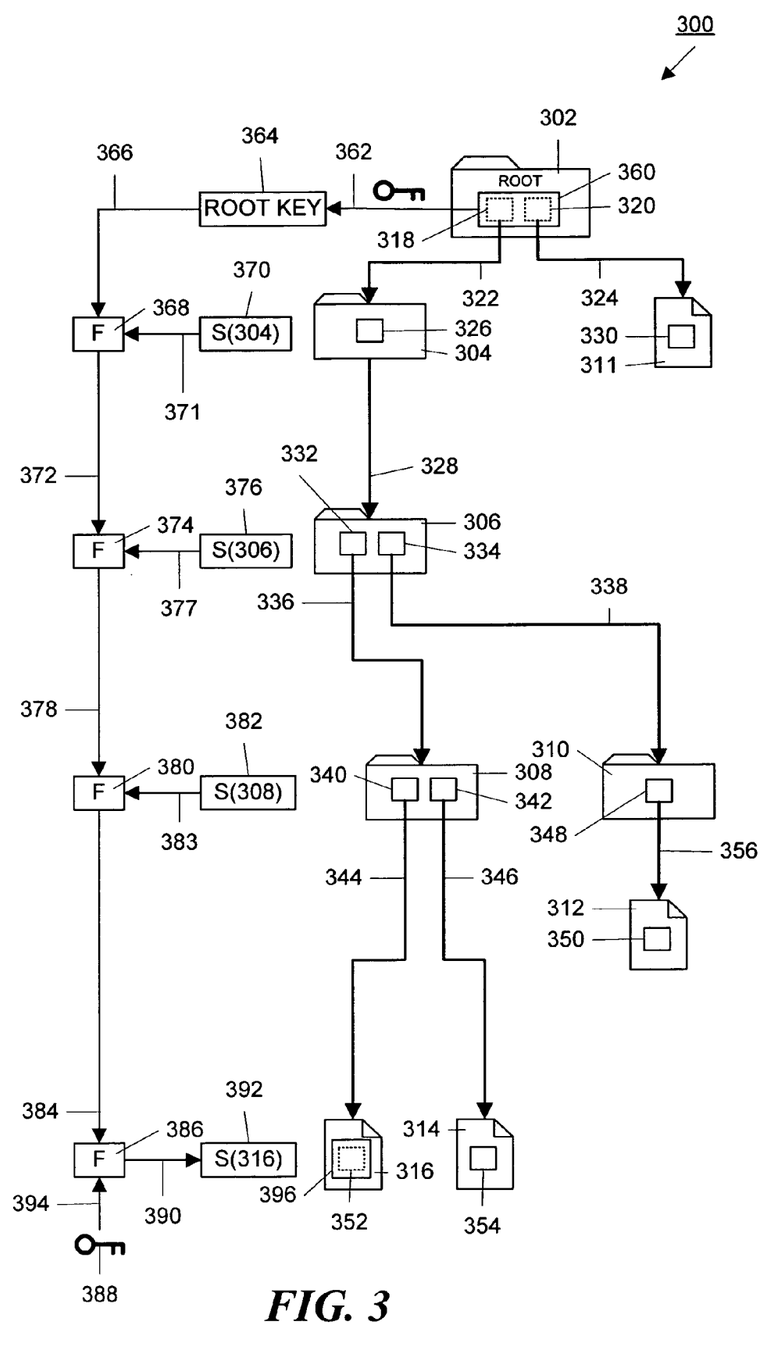
FIG. 3 is a block schematic diagram illustrating that calculation of a stub for a data object that has been inserted into the storage hierarchy in accordance with the process set forth in FIG. 2.
Figure 4:
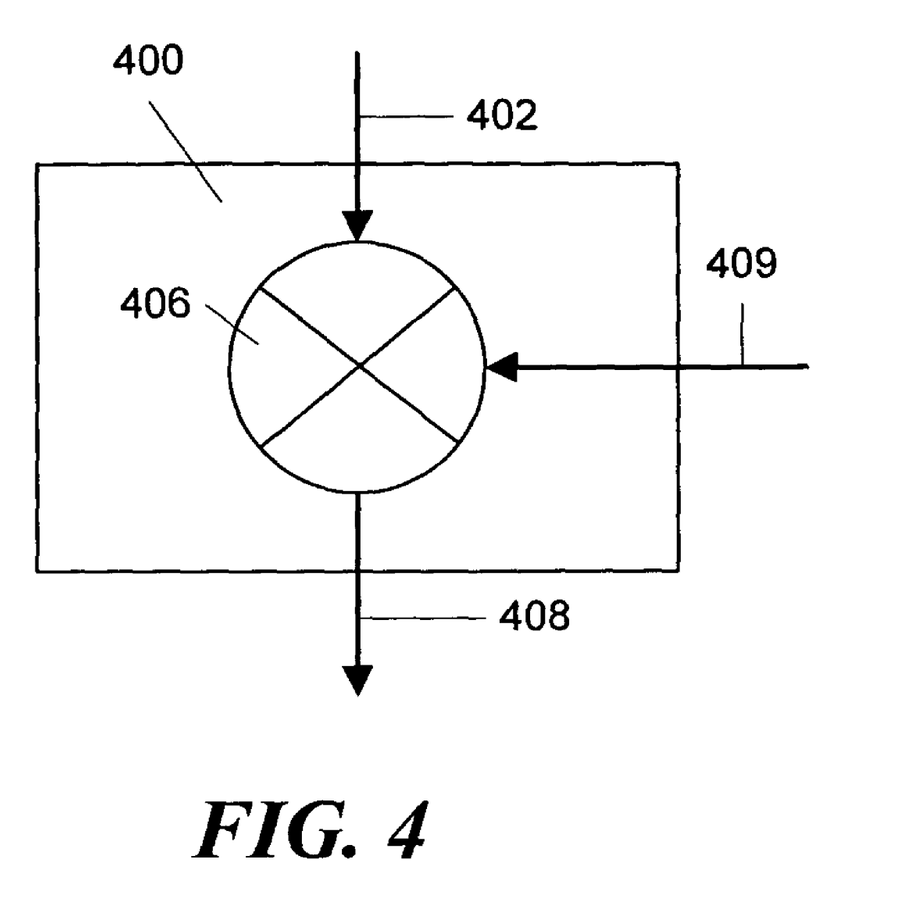
FIG. 4 is a block schematic diagram of a calculator that uses an exclusive-OR function to calculate stubs and keys.

Equation (6) shows that the stub of an object is simply the XOR of the key of that object and all of the stubs of its ancestors. This mechanism is illustrated in FIGS. 2, 3 and 4 which illustrate the insertion of a new file 316 with a key 388 as a child of directory 308. The steps in a computation of a stub for an object inserted into a storage hierarchy are shown in the flowchart of FIG. 2. The operation is shown schematically in FIGS. 3 and 4. As previously mentioned, the stub of the root is calculated before the process begins. This calculation is illustrated in FIG. 3 which illustrates the inventive principles as applied to the hierarchical data storage system of FIG. 1. In FIG. 3, elements that correspond to elements shown in FIG. 1 have been given corresponding numeral designations. In particular, numerals starting with "1" and FIG. 1 start with a "3" in FIG. 3. For example, root directory 102 in FIG. 1 corresponds to root directory 302 in FIG. 3. In FIG. 3, the contents of the root object, in this case the references 318 and 320 in the root directory 302 are encrypted as indicated schematically by box 360 with a randomly selected key as indicated schematically by arrow 362 and used as the stub 364 for the root object 302.

The process of calculating the stub for an inserted object begins in step 200 and proceeds to step 201 where the cached output of the stub calculation function is set to the stub of the root object (corresponding to Equation (3) above). In step 202, a determination is made whether, starting at the root object and following the data path, the parent object of the inserted object has been reached. If not, the process proceeds to step 204 where the next object in the data path is selected. In the case of the data storage system shown in FIG. 3, this next object is the directory 304.

Next, in step 208, the stub 370 (which may have been previously calculated and cached and now is available, via a lookup operation) for directory 304 is obtained and provided to the function $F_s$ (368) as indicated schematically by arrow 371. The contents of the function calculator boxes 368, 374, 380 and 386, for the implementation under discussion, are shown in FIG. 4. The function calculator 400 receives two inputs 402 and 404 and comprises a bitwise exclusive-OR calculator 406 which may operate in software or hardware. The output 408 of the calculator 406 may be temporarily stored or cached in preparation for the next calculation.

In step 212, the stub obtained in step 208 is combined with the cached output of the previous calculation. In this case, the result of the previous calculation is the stub of the root object as indicated schematically by arrow 366.

The process then proceeds back to step 202 where a determination is made whether, following the data path, the parent object of the inserted object has been reached. If not, in step 204, the next object in the data path is selected. In this case the directory 306 is the next object in the data path. In steps 208 and 212, the stub 376 for directory 306 is obtained and provided to the calculator 374 as indicated schematically by arrow 377 along with the cached output of calculator 368, as indicated schematically by arrow 372.

Processing continues in this manner for the next object (directory 308) in the data path. During this processing, the stub 382 for directory 308 is obtained and provided to the calculator 380 as indicated schematically by arrow 383 along with the cached output of calculator 374, as indicated schematically by arrow 378.

Finally, in step 202, it is determined that the parent object of the inserted object 316 has been reached in the data path. In this case, the process proceeds to step 206. As previously mentioned, the contents 352 of data object 316 have been encrypted before the object is stored as indicated schematically by box 396. The decryption key 388 is provided to calculator 386 as indicated by arrow 394 along with the cached output of calculator 380. In step 206, the cached output is combined with the decryption key 388 to generate the stub 392 for data object 316 as indicated by arrow 390.

In step 210, the generated stub is stored, either with the data object or in another location which is then associated with the data object. The process then ends in step 214.

The key K(x) of an existing object can be computed by following a procedure similar to that used to compute a stub. In particular, the key can be computed by starting with the definition:

$$K(x)=S(x)\otimes K(P(x))$$

And then repeatedly substituting for K(Px)) to solve for the keys of the ancestors, resulting in the following:

$$K(x)=S(x)\otimes S(P(x))\otimes S(P(P(x)))\ldots \otimes S(r) \quad (7)$$

Equation 7 shows that the key of an object is simply the XOR of the stub of that object and all of the stubs of its ancestors.

Figure 5:
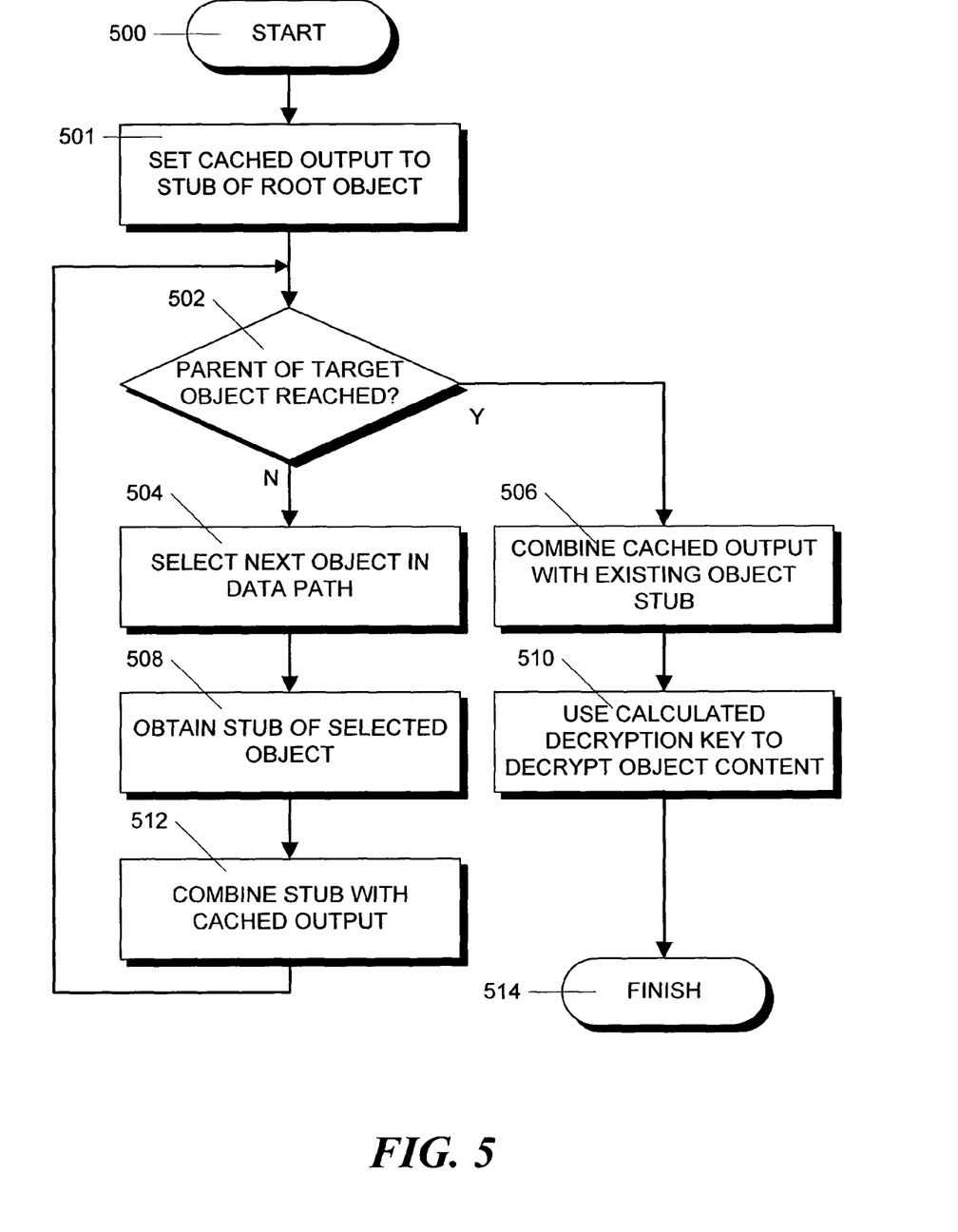
FIG. 5 is a flowchart showing the steps in an illustrative process for calculating a decryption key for a data object that has been stored in the storage hierarchy.
Figure 6:
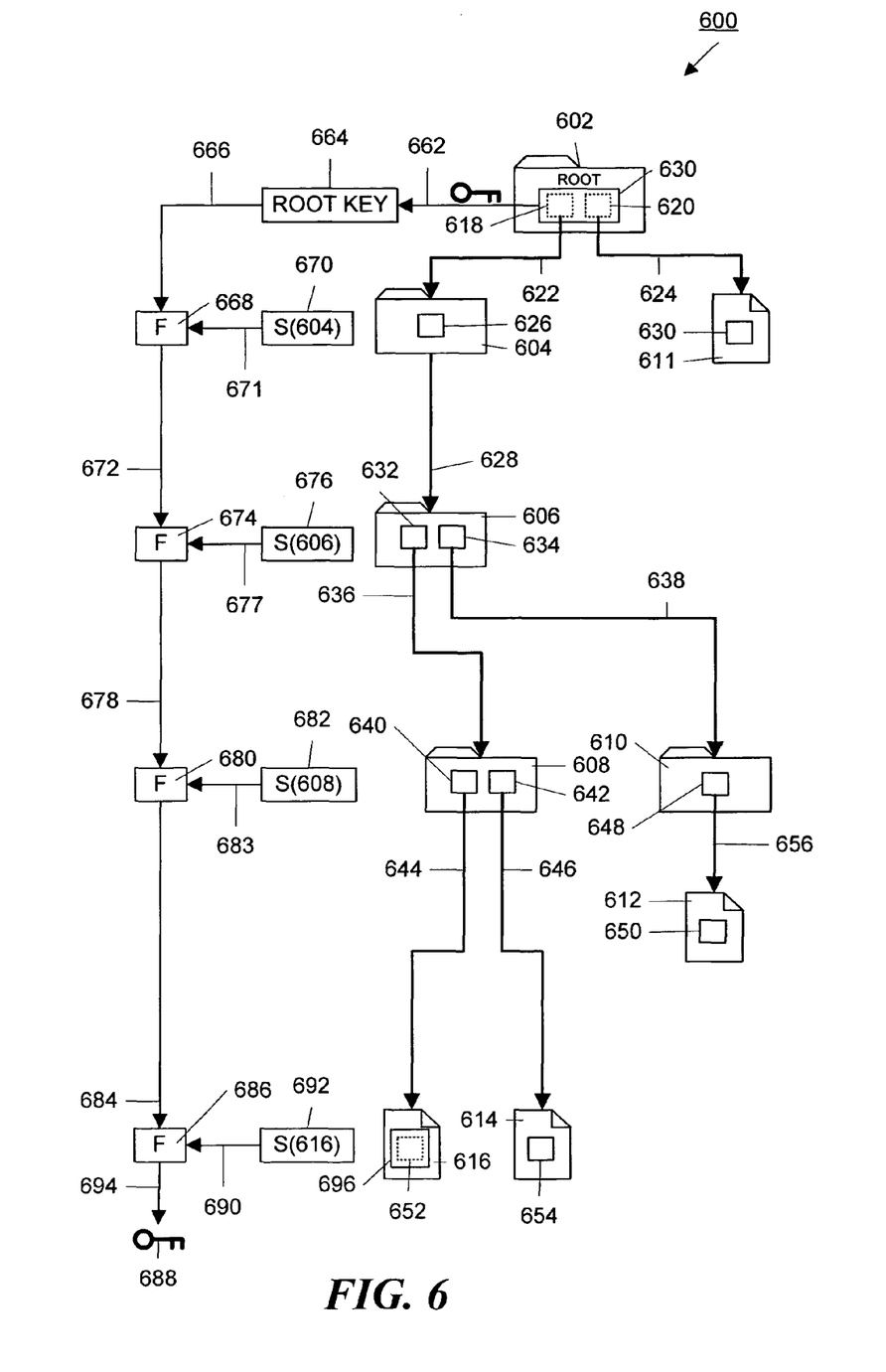
FIG. 6 is a block schematic diagram illustrating that calculation of a decryption key for a data object that has been stored in the storage hierarchy in accordance with the process set forth in FIG. 5.

The mechanism for calculating a key is illustrated in FIGS. 5 and 6 which illustrate the calculation of a key 688 for file 616. The steps in a computation of a decryption key for an object in a storage hierarchy (except for the root object) are shown in the flowchart of FIG. 5. The operation is shown schematically in FIG. 6. As with FIG. 3, in FIG. 6, elements that correspond to elements shown in FIG. 1 have been given corresponding numeral designations. For example, root directory 102 in FIG. 1 corresponds to root directory 602 in FIG. 6. The stub 664 for the root object 602 has been calculated as previously described.

The process of calculating a decryption key for an existing object, other than the root object, begins in step 500 and proceeds to step 501 where the cached output of the key calculation function is set to the stub of the root object. In step 502, where a determination is made whether, starting at the root object and following the data path, the parent object of the target object, for which the decryption key is to be calculated, has been reached. If not, the process proceeds to step 504 where the next object in the data path is selected. In the case of the data storage system shown in FIG. 6, this next object is the directory 604.

Next, in step 508, the stub 670 (which may have been previously calculated and cached and is now available, via a lookup operation) for directory 604 is obtained and provided to the function $F_K$ (668) as indicated schematically by arrow 671. The contents of the function calculator boxes 668, 674, 680 and 686, for the implementation under discussion, are shown in FIG. 4 as previously discussed.

In step 512, the stub obtained in step 508 is combined with the cached output of the previous calculation. In this case, the result of the previous calculation is the stub of the root object (equal to its key) as indicated schematically by arrow 666.

The process then proceeds back to step 502 where a determination is made whether, following the data path, the parent object of the target object has been reached. If not, in step 504, the next object in the data path is selected. In this case, the directory 606 is the next object in the data path. In steps 508 and 512, the stub 676 for directory 606 is obtained and provided to the calculator 674 as indicated schematically by arrow 677 along with the cached output of calculator 668, as indicated schematically by arrow 672.

Processing continues in this manner for the next object (directory 608) in the data path. During this processing, the stub 682 for directory 608 is obtained and provided to the calculator 680 as indicated schematically by arrow 683 along with the cached output of calculator 674, as indicated schematically by arrow 678.

Finally, in step 502, it is determined that the parent object of the target object 616 has been reached in the data path. In this case, the process proceeds to step 506. The stub 692 for data object 616 is then obtained and provided to calculator 686 as indicated by arrow 690. In step 506, the cached output of calculator 680 (as indicated by arrow 684) is combined with the stub 692 to generate a decryption key for data object 616 as indicated schematically by arrow 694.

In step 510, the content of data object 616 is decrypted using the calculated decryption key. The process then ends in step 514.

Since the stub of an object is defined as a function of its key and the stubs of the ancestors of the object, if the ancestry of the object changes, for example, if the object is moved, then the stub must change as well. However, it is not necessary to decrypt the object content and then re-encrypt that content. Thus, moving an object from one position in the storage hierarchy to another position is relatively simple and inexpensive operation.

Let $P_1(x)$ be the current parent of x and $P_2(x)$ be a new parent which results because the object has moved. Let $S_1(x)$ be the current stub of x and $S_2(x)$ be the new stub. By definition:

$$K(x)=S_1(x) \otimes K(P_1(x))$$

and $$K(x)=S_2(x) \otimes K(P_2(x))$$

Manipulating these equations to solve for $S_2(x)$ gives the following:

$$S_2(x) \otimes K(P_2(x))=S_1(x) \otimes K(P_1(x))$$

therefore $$S_2(x)=K(P_2(x)) \otimes S_1(x) \otimes K(P_1(x))$$

therefore $$S_2(x)=K(P_2(x)) \otimes K(x) \quad (8)$$

Equation (8) defines the new stub of the object in terms of the object key and the key of its new parent. Note that this equation is the same as Equation (5) with the exception that the parent is now the new parent. The object key can be calculated by using Equation (7) and the process set forth in FIGS. 5 and 6 by following the data path from the root object to the original parent object. Once this key is obtained, then moving the object is the same as inserting the object as a child of the new parent and the new stub can be calculated with the process illustrated in FIGS. 2 and 3, by following the data path from the root object to the new parent object.

Although it was assumed that the data storage system was hierarchical in the above discussion, the inventive principles can also be extended to non-hierarchical systems. In particular, some systems that appear hierarchical, such as the UNIX file system, actually permit non-hierarchical constructions. As an example, the UNIX file system permits a file to have more than one parent directory. Such a file is not deleted from the system until it is deleted from every one of its parent directories. There are two straightforward methods for dealing with ambiguous ancestry. The first method is to assign every file that has more than one parent a designated parent and use this as the parent to compute the key. If an ancestor directory is deleted, then a new designated parent is selected and a new stub corresponding to the new ancestry is chosen, in exactly the same manner as if the file had been moved from one directory to another.

The drawback of this method is that it requires each directory delete operation to traverse all of the subdirectories looking for files with multiple parent directories so that these files can be assigned a new ancestor (if there are any that survive the deletion). This is potentially quite costly.

The second method is to have every file manage a list of ancestors and a corresponding list of stubs. Either of these methods is practical to implement as long as the number of nodes with ambiguous ancestry is relatively low or the maximum number of parents of each node is bounded by a low constant.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different functions may be used for the calculation of the stubs and key. In addition, in the discussion above, the calculation of keys and stubs is described by starting at the root object and proceeding down the hierarchy to the leaf objects. Keys and stubs can also be calculated starting at the leaf objects and proceeding to the root object. If the operator used to compute the keys and stubs is commutative, then the keys and stubs can be calculated by proceeding in either direction depending on the context. An accumulator may also be used instead of temporarily caching intermediate results. The order of the process steps may also be changed without affecting the operation of the invention. Other aspects, such as the specific process flow, as well as other modifications to the inventive concept are intended to be covered by the appended claims.

What is claimed is:

1. A method for constructing a data storage system in which objects can be securely deleted, the storage system having a hierarchy that is based on content relationships and extends from a root content-containing data object down to leaf content-containing data objects, the method comprising:
    (a) before storing each data object, other than the root data object, in the storage hierarchy, encrypting content contained in that data object with an encryption algorithm having a decryption key, wherein none of the decryption keys other than a root decryption key is durably stored;
    (b) computing for each data object, a stub that is the output of a function of the decryption key and a decryption key of a parent data object; and
    (c) associating the stub computed in step (b) with the data object for which the stub was computed.

2. The method of claim 1 further comprising:
    (d) computing for the root data object, a stub from a decryption key that is chosen randomly.

3. The method of claim 1 further comprising:
    (e) computing for the root data object, a stub from a key chosen by an administrator of the data storage system.

4. The method of claim 1 wherein step (a) comprises generating each decryption key with a cryptographic random number generator.

5. The method of claim 1 wherein step (b) comprises computing for each data object a stub that is a bit-wise exclusive-OR of the decryption key for that data object and each stub of each ancestor of that data object.

6. The method of claim 1 further comprising:
    (d) securely deleting a data object by securely deleting a stub associated with that data object.

7. The method of claim 1 further comprising:
    (d) securely deleting the data object by securely deleting a stub associated with an ancestor of that data object.

8. The method of claim 1 wherein the decryption key of the parent data object is determined by:
    computing the decryption key as the output of a key function of the stub associated with that data object and the stubs of all of the ancestors of that data object.

9. The method of claim 1 further comprising:
    (d) moving an object in the hierarchy from an original parent object to a new parent object by computing a new stub that is the output of a function of the decryption key of that object and the stubs of all of the new ancestors of that object in the path between the root object and the new parent object.

10. A data storage system having data storage media in which objects can be securely deleted, the storage system having a hierarchy that is based on content relationships and extends from a root content-containing data object down to leaf content-containing data objects, the data storage system comprising:
    an encryption mechanism that operates before each data object, other than the root data object, is stored in the storage hierarchy, to encrypt content contained in that data object with an encryption algorithm having a decryption key, wherein none of the decryption keys other than a root decryption key is durably stored;
    a stub calculator that computes for each data object a stub that is the output of a function of the decryption key and the stubs of all of the ancestors of the data object; and
    a mechanism that associates the stub computed by the stub calculator with the data object for which the stub was computed and stores the stub in the data storage media.

11. The system of claim 10 further comprising: a mechanism that computes, for the root data object, a stub from a decryption key that is chosen randomly.

12. The system of claim 10 further comprising: a mechanism that computes, for the root data object, a stub from a key chosen by an administrator of the data storage system.

13. The apparatus of claim 10 wherein the stub calculator comprises a mechanism that computes for each data object a stub that is a bit-wise exclusive-OR of the decryption key for that data object and each stub of each ancestor of that data object.

14. The system of claim 10 further comprising: a key calculator that computes for a data object a decryption key as the output of a key function of the stub associated with that data object and the stubs of all of the ancestors of that data object.

15. The system of claim 10 further comprising moving an object in the hierarchy from an original parent object to a new parent object by using the stub calculator to compute a new stub that is the output of a function of the decryption key of that object and the stubs of all of the ancestors of that object in the path between the root object and the new parent object.

16. A data storage system having data storage media in which objects can be securely deleted, the storage system having a hierarchy that is based on content relationships and extends from a root content-containing data object down to leaf content-containing data objects, the system comprising:
    means operable before each data object, other than the root data object, is stored in the storage hierarchy, for encrypting content contained in that data object with an encryption algorithm having a decryption key, wherein none of the decryption keys other than a root decryption key is durably stored;

means for computing for each data object a stub that is the output of a function of the decryption key and the stubs of all ancestors of the data object; and means for associating the stub computed by the stub calculator with the data object for which the stub was computed and storing the stub in the storage media.

17. The system of claim 16 further comprising:

means for computing, for the root data object, a stub from a decryption key that is chosen randomly.

18. The system of claim 16 further comprising:

means for computing, for the root data object, a stub from a key chosen by an administrator of the data storage system.

19. The system of claim 16 further comprising:

means for computing for a data object a decryption key as the output of a key function of the stub associated with that data object and the stubs of all of the ancestors of that data object.

20. The system of claim 16 further comprising means for moving an object in the hierarchy from an original parent object to a new parent object by computing a new stub that is the output of a function of the decryption key of that object and the stubs of all new ancestors of that object in the path between the root object and the new parent object.

* * * * *